(12) United States Patent
Atsushi et al.

(10) Patent No.: US 8,746,810 B2
(45) Date of Patent: Jun. 10, 2014

(54) BRAKE FLUID PRESSURE CONTROL DEVICE

(75) Inventors: Hiroaki Atsushi, Yokohama (JP); Tohru Masuno, Yokohama (JP); Makoto Sasaki, Yokohama (JP); Yoshio Tajika, Yokohama (JP); Sirichai Bannasarn, Yokohama (JP)

(73) Assignee: Bosch Corporation, Tokyo (JP)

( * ) Notice: Subject to any disclaimer, the term of this patent is extended or adjusted under 35 U.S.C. 154(b) by 223 days.

(21) Appl. No.: 12/741,125

(22) PCT Filed: Oct. 28, 2008

(86) PCT No.: PCT/JP2008/069556
§ 371 (c)(1),
(2), (4) Date: May 3, 2010

(87) PCT Pub. No.: WO2009/057594
PCT Pub. Date: May 7, 2009

(65) Prior Publication Data
US 2010/0264723 A1    Oct. 21, 2010

(30) Foreign Application Priority Data
Nov. 2, 2007  (JP) ................................ 2007-285921

(51) Int. Cl.
*B60T 13/16*   (2006.01)
*B60T 17/04*   (2006.01)

(52) U.S. Cl.
USPC ... 303/119.3; 303/10; 303/137; 303/DIG. 10; 303/113.1; 303/116.1

(58) Field of Classification Search
USPC .............. 303/10–11, 6.01, 113.1, 119.3, 137, 303/DIG. 10, 116.1
See application file for complete search history.

(56) References Cited

U.S. PATENT DOCUMENTS 5,035,469 A * 7/1991 Geilen et al. .................... 303/87
6,234,199 B1 * 5/2001 Nohira ........................... 137/557
(Continued)

FOREIGN PATENT DOCUMENTS

JP    2000071963      3/2000
JP    2001191908 A    7/2001
(Continued)

OTHER PUBLICATIONS

Translation of Chinese Office Action dated Apr. 16, 2012.

*Primary Examiner* — Anna Momper
(74) *Attorney, Agent, or Firm* — Michael Best & Friedrich LLP

(57) ABSTRACT

A brake fluid pressure control device 10 includes: a block-shaped housing 30, front and rear wheel-use flow paths, mounting holes in each side surface of the housing 30; a pair of front wheel-use switching valve bodies 1a and 2a that are mounted in a pair of mounting holes 31a and 31b that control the pressure of a brake fluid supplied to a front wheel-use wheel cylinder 103; a pair of rear wheel-use switching valve bodies 3a and 4a that are mounted in a pair of mounting holes 31c and 31d that control the pressure of the brake fluid supplied to a rear wheel-use wheel cylinder 106; a pressure sensor 13 that is inserted inside a mounting hole 31j in the first side surface 30a of the housing 30; and an electronic control unit 8 that drives and controls the front wheel-use and rear wheel-use switching valve bodies 1a to 4a.

16 Claims, 7 Drawing Sheets

(56) References Cited

U.S. PATENT DOCUMENTS

| | | |
|---|---|---|
| 2002/0125764 A1 | 9/2002 | Sakamoto |
| 2003/0155809 A1 | 8/2003 | Schlitzkus et al. |
| 2005/0242661 A1* | 11/2005 | Nakazawa ................. 303/119.3 |
| 2006/0055232 A1 | 3/2006 | Koyama |
| 2008/0106145 A1* | 5/2008 | Hinz et al. .................... 303/152 |

FOREIGN PATENT DOCUMENTS

| | | |
|---|---|---|
| JP | 2005145239 | 6/2005 |
| JP | 2006111245 A | 4/2006 |
| JP | 2006312359 A | 11/2006 |
| WO | WO 2006058859 A1 * | 6/2006 |

* cited by examiner

BRAKE FLUID PRESSURE CONTROL DEVICE

TECHNICAL FIELD

The present invention relates to a brake fluid pressure control device that controls brake fluid pressure and particularly relates to a brake fluid pressure control device that is disposed between master cylinders and wheel cylinders and controls the pressure of a brake fluid supplied from the master cylinders to the wheel cylinders to thereby perform antilock brake control of a vehicle.

BACKGROUND ART

Conventionally, there has been known a brake fluid pressure control device that includes: a pipe that couples together a master cylinder and a wheel cylinder; plural electromagnetic switching valves for switching the flow of a brake fluid that flows inside the pipe; an electronic control unit that controls these electromagnetic switching valves to thereby control the pressure of the brake fluid; and a pump for returning the brake fluid from the wheel cylinder to the master cylinder (e.g., see patent document 1).

Patent Document 1: JP-A-2001-191908

DISCLOSURE OF THE INVENTION

Problems to be Solved by the Invention

The above-described brake fluid pressure control device performs brake fluid pressure control of a four-wheeled motor vehicle. Consequently, when this control device is, for example, applied to a two-wheeled motor vehicle, there arises the need to perform design changes to curtail the number of unnecessary electromagnetic switching values and flow paths. At this time, when only simple design changes, such as simply curtailing the number of and arranging these electromagnetic valves and flow paths, are performed in order to apply a control device for a four-wheeled motor vehicle to a control device for a two-wheeled motor vehicle, it is difficult to say that the control device is efficiently made compact and lightweight because there is the fear that, for example, wasted space or the like will arise.

The present invention has been made in view of the above-described conventional problem, and it is an object thereof to efficiently make a brake fluid pressure control device compact and lightweight.

Means for Solving the Problems

An aspect of the present invention for achieving the above-described object is a brake fluid pressure control device that is disposed between front wheel-use and rear wheel-use master cylinders and front wheel-use and rear wheel-use wheel cylinders and controls the pressure of a brake fluid supplied from the front wheel-use and rear wheel-use master cylinders to the front wheel-use and rear wheel-use wheel cylinders to thereby perform antilock brake control of a two-wheeled motor vehicle, the brake fluid pressure control device comprising:

a block-shaped housing, inside of which are respectively formed a front wheel-use flow path for the brake fluid to flow from the front wheel-use master cylinder to the front wheel-use wheel cylinder and a rear wheel-use flow path for the brake fluid to flow from the rear wheel-use master cylinder to the rear wheel-use wheel cylinder, with a plurality of mounting holes that are communicated with the front wheel-use and rear wheel-use flow paths being formed in each side surface of the housing;

a pair of front wheel-use switching valve bodies that are mounted in a pair of the mounting holes formed along one end edge of a first side surface that forms a substantially square shape of the housing, with the front wheel-use switching valve bodies switching the front wheel-use flow path between a communicated state and a blocked state to thereby control the pressure of the brake fluid supplied to the front wheel-use wheel cylinder;

a pair of rear wheel-use switching valve bodies that are mounted in a pair of the mounting holes formed along another end edge that opposes the one end edge of the first side surface of the housing, with the rear wheel-use switching valve bodies switching the rear wheel-use flow path between a communicated state and a blocked state to thereby control the pressure of the brake fluid supplied to the rear wheel-use wheel cylinder;

a pressure sensor that is inserted inside the mounting hole in the first side surface of the housing and detects the pressure of the brake fluid supplied to the front wheel-use or rear wheel-use wheel cylinder; and an electronic control unit that is mounted on the first side surface, with the pressure sensor being connected to the electronic control unit, and drives and controls the front wheel-use and rear wheel-use switching valve bodies.

According to this aspect, the brake fluid pressure control device can be efficiently made compact and lightweight.

Further, in this aspect, the mounting holes for the pair of front wheel-use switching valve bodies may be respectively formed so as to be parallel with respect to the one end edge of the first side surface, and the mounting holes for the pair of rear wheel-use switching valve bodies may be respectively formed so as to be parallel with respect to the other end edge of the first side surface.

Further, in this aspect, the pair of front wheel-use switching valve bodies and the pair of rear wheel-use switching valve bodies may be disposed so as to become substantially symmetrical about a vertical direction centerline of the first side surface.

It will be noted that, in this aspect, the front wheel-use flow path and the rear wheel-use flow path may be formed so as to become substantially symmetrical about the vertical direction centerline of the first side surface.

In this aspect, the plurality of mounting holes that are communicated with the front wheel-use and rear wheel-use flow paths may be formed in a second side surface and a third side surface that are perpendicular to the first side surface of the housing and oppose each other, and the brake fluid pressure control device may further comprise: a plunger type pump that includes a pair of pistons that are mounted inside the mounting holes in the second side surface and the third side surface and pressurize the brake fluid inside the front wheel-use and rear wheel-use flow paths and a motor that is disposed on a fourth side surface opposing the first side surface and causes the pair of pistons to reciprocally move; and a pair of accumulators that are disposed on a fifth side surface adjacent to the first side surface and decreases the pressure of the brake fluid.

In this aspect, the brake fluid pressure control device may further comprise a bracket that is mounted on a side surface of the housing, wherein the brake fluid pressure control device is mounted on the two-wheeled motor vehicle via the bracket.

In this aspect, a pin member that extends downward may be formed on the fifth side surface of the housing, an open portion into which the pin member is inserted may be formed in the bracket, and the pin member of the housing and the open portion of the bracket may be coupled together, whereby the brake fluid pressure control device is supported at one point.

In this aspect, the pressure sensor may be disposed in a substantial center of the pair of front wheel-use switching valve bodies and the pair of rear wheel-use switching valve bodies.

In this aspect, on the first side surface of the housing, the pair of front wheel-use switching valve bodies and the pair of rear wheel-use switching valve bodies may be disposed in a substantially square shape, and the pressure sensor may be disposed at a point of intersection of diagonal lines of the substantial square shape.

Effects of the Invention

According to the present invention, a brake fluid pressure control device can efficiently be made compact and lightweight.

DESCRIPTION OF THE REFERENCE NUMERALS

1 Front Wheel-Use EV Electromagnetic Valve
1a First Switching Valve Body
2 Front Wheel-Use AV Electromagnetic Valve
2a Second Switching Valve Body
3 Rear Wheel-Use EV Electromagnetic Valve
3a Third Switching Valve Body
4 Rear Wheel-Use AV Electromagnetic Valve
4a Fourth Switching Valve Body
5 Front Wheel-Use Pump
6 Rear Wheel-Use Pump
7 Motor
8 Electronic Control Unit
9 Accumulator
10 Brake Fluid Pressure Control Device
11 Front Wheel-Use Flow Path
12 Accumulator
13 Pressure Sensor
30 Housing
30a First Side Surface
30b Second Side Surface
30c Third Side Surface
30d Fourth Side Surface
30e Fifth Side Surface
30f Sixth Side Surface
32 Center Pin
40 Bracket
101 Front Wheel-Use Master Cylinder
103 Front Wheel-Use Wheel Cylinder
104 Rear Wheel-Use Master Cylinder
106 Rear Wheel-Use Wheel Cylinder

BEST MODE FOR CARRYING OUT THE INVENTION

Figure 1:
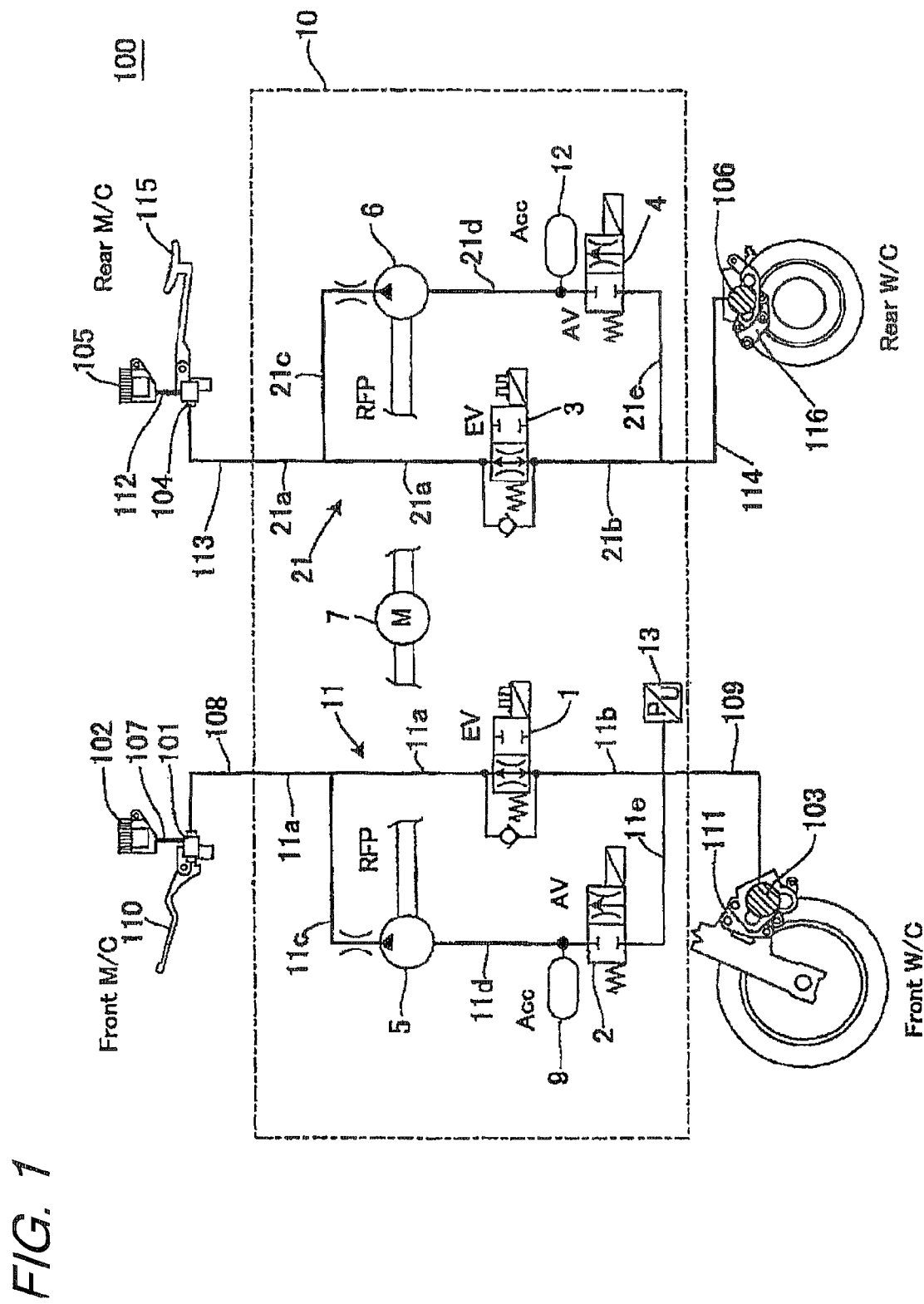
FIG. 1 A diagram showing an example of a brake-use hydraulic circuit that has a built-in brake fluid pressure control device pertaining to an embodiment of the present invention.

Below, the best mode for carrying out the present invention will be described with reference to the attached drawings. FIG. 1 is a diagram of a brake-use hydraulic circuit that has a built-in brake fluid pressure control device pertaining to an embodiment of the present invention. It will be noted that "up" and "down" in the preceding and following descriptions will refer to a vehicle upper side and a vehicle lower side.

A brake-use hydraulic circuit 100 shown in FIG. 1 is, for example, built into a two-wheeled motor vehicle and is applied to a hydraulic circuit for publicly known antilock brake control. Here, antilock brake control (so-called ABS control) refers, for example, to control to intermittently decrease brake fluid pressure to suppress locking of a wheel during vehicle braking. It will be noted that the operating principle and the basic control technique of antilock brake control are already known to persons skilled in the art, so detailed description thereof will be omitted.

The brake-use hydraulic circuit 100 is equipped with: a front wheel-use master cylinder (Front M/C) 101, a front wheel-use reservoir tank 102 and a front wheel-use wheel cylinder (Front W/C) 103 for generating braking force with respect to a front wheel; a rear wheel-use master cylinder (Rear M/C) 104, a rear wheel-use reservoir tank 105 and a rear wheel-use wheel cylinder (Rear W/C) 106 for generating braking force with respect to a rear wheel; and a brake fluid pressure control device 10.

The brake fluid pressure control device 10 is disposed between the front wheel-use and rear wheel-use master cylinders 101 and 104 and the front wheel-use and rear wheel-use wheel cylinders 103 and 106. Further, the brake fluid pressure control device 10 controls the pressure of a brake fluid supplied from the front wheel-use master cylinder 101 to the front wheel-use wheel cylinder 103 and/or controls the pressure of the brake fluid supplied from the rear wheel-use master cylinder 104 to the rear wheel-use wheel cylinder 106 to thereby perform the aforementioned antilock brake control.

The front wheel-use reservoir tank 102 is connected to the front wheel-use master cylinder 101 via a first pipe 107. Further, the front wheel-use wheel cylinder 103 is connected to the front wheel-use master cylinder 101 via a second pipe 108, the brake fluid pressure control device 10 and a third pipe 109.

When the front wheel-use master cylinder 101 is driven by a handle lever 110 of the vehicle, for example, the front wheel-use master cylinder 101 generates brake fluid pressure with respect to the front wheel-use master cylinder 103 via the brake fluid pressure control device 10. Further, the front wheel-use wheel cylinder 103 drives a front wheel-use disc brake device 111 in response to the brake fluid pressure that is supplied and brakes the front wheel.

The rear wheel-use reservoir tank 105 is connected to the rear wheel-use master cylinder 104 via a fourth pipe 112. Further, the rear wheel-use wheel cylinder 106 is connected to the rear wheel-use master cylinder 104 via a fifth pipe 113, the brake fluid pressure control device 10 and a sixth pipe 114.

When the rear wheel-use master cylinder 104 is driven by a foot pedal 115 of the vehicle, for example, the rear wheel-use master cylinder 104 generates brake fluid pressure with respect to the rear wheel-use master cylinder 106 via the brake fluid pressure control device 10. Further, the rear wheel-use wheel cylinder 106 drives a rear wheel-use disc brake device 116 in response to the brake fluid pressure that is supplied and brakes the rear wheel.

Next, the brake fluid pressure control device 10 pertaining to the present embodiment will be described in detail.

The brake fluid pressure control device 10 includes a front wheel-use EV electromagnetic valve 1, a front wheel-use AV electromagnetic valve 2, a rear wheel-use EV electromagnetic valve 3, a rear wheel-use AV electromagnetic valve 4, a front wheel-use pump 5, a rear wheel-use pump 6, a motor 7 and an electronic control unit (ECU) 8.

The front wheel-use EV and AV electromagnetic valves 1 and 2 and the rear wheel-use EV and AV electromagnetic valves 3 and 4 are publicly known 2-position electromagnetic valves, for example. Further, in a normal state, that is, a state where antilock brake control is not performed, the front wheel-use EV electromagnetic valve 1 and the rear wheel-use EV electromagnetic valve 3 are in an open state and the front wheel-use AV electromagnetic valve 2 and the rear wheel-use AV electromagnetic valve 4 are in a closed state. Further, the front wheel-use pump 5 and the rear wheel-use pump 6 are configured to be driven by the motor 7. The electromagnetic valves 1, 2, 3 and 4 and the motor 7 are connected to the electronic control unit 8 and are driven and controlled on the basis of control signals from this electronic control unit 8.

The brake fluid pressure control device 10 includes: a front wheel-use flow path 11 for the brake fluid supplied from the front wheel-use master cylinder 101 to the front wheel-use wheel cylinder 103 to flow through; and a rear wheel-use flow path 21 for the brake fluid supplied from the rear wheel-use master cylinder 104 to the rear wheel-use wheel cylinder 106 to flow through.

In the front wheel-use flow path 11, one end side of a first flow path 11a is connected to the second pipe 108, and the other end side of the first flow path 11a is connected to the front wheel-use EV electromagnetic valve 1. One end side of a second flow path 11b is connected to the front wheel-use EV electromagnetic valve 1, and the other end side of the second flow path 11b is connected to the third pipe 109. One end side of a third flow path 11c is connected to the first flow path 11a, and the other end side of the third flow path 11c is connected to a discharge side of the front wheel-use pump 5. One end side of a fourth flow path 11d is connected to a suction side of the front wheel-use pump 5, and the other end side of the fourth flow path 11d is connected to the front wheel-use AV electromagnetic valve 2. The front wheel-use pump 5 causes the brake fluid to flow from the fourth flow path 11d side to the third flow path 11c side, that is, from the front wheel-use wheel cylinder 103 side to the front wheel-use master cylinder 101 side. An accumulator 9 that decreases the pressure of the brake fluid is connected to the fourth flow path 11d. One end side of a fifth flow path 11e is connected to the second flow path 11b, and the other end of the fifth flow path 11e is connected to the front wheel-use AV electromagnetic valve 2. A pressure sensor 13 for detecting the pressure of the brake fluid supplied to the front wheel-use wheel cylinder 103 is disposed in the second flow path 11b. By disposing the pressure sensor 13 in this manner, it becomes possible to perform sophisticated pressure control of the brake fluid.

In the rear wheel-use flow path 21, substantially similar to the aforementioned front wheel-use flow path 11, one end side of a first flow path 21a is connected to the second pipe 113, and the other end side of the first flow path 21a is connected to the rear wheel-use EV electromagnetic valve 3. One end side of a second flow path 21b is connected to the rear wheel-use EV electromagnetic valve 3, and the other end side of the second flow path 21b is connected to the third pipe 114. One end of a third flow path 21c is connected to the first flow path 21a, and the other end side of the third flow path 21c is connected to a discharge side of the rear wheel-use pump 6. One end side of a fourth flow path 21d is connected to a suction side of the rear wheel-use pump 6, and the other end side of the fourth flow path 21d is connected to the rear wheel-use AV electromagnetic valve 4. The rear wheel-use pump 6 causes the brake fluid to flow from the fourth flow path 21d side to the third flow path 21c side, that is, from the rear wheel-use wheel cylinder 106 side to the rear wheel-use master cylinder 104 side. An accumulator 12 that decreases the pressure of the brake fluid is connected to the fourth flow path 21d. One end of a fifth flow path 21e is connected to the second flow path 21b, and the other end of the fifth flow path 21e is connected to the rear wheel-use AV electromagnetic valve 4.

It will be noted that check valves (one-way valves) are respectively annexed to the front wheel-use and rear wheel-use electromagnetic valves 1 and 3 and that throttle valves are respectively disposed on the discharge sides of the front wheel-use and rear wheel-use pumps 5 and 6. Further, one filter each is disposed in front of and in back of the front wheel-use and rear wheel-use EV electromagnetic valves 1 and 3, in front of the front wheel-use and rear wheel-use pumps 5 and 6 and in front of the front wheel-use and rear wheel-use AV electromagnetic valves 2 and 4.

Figure 2:
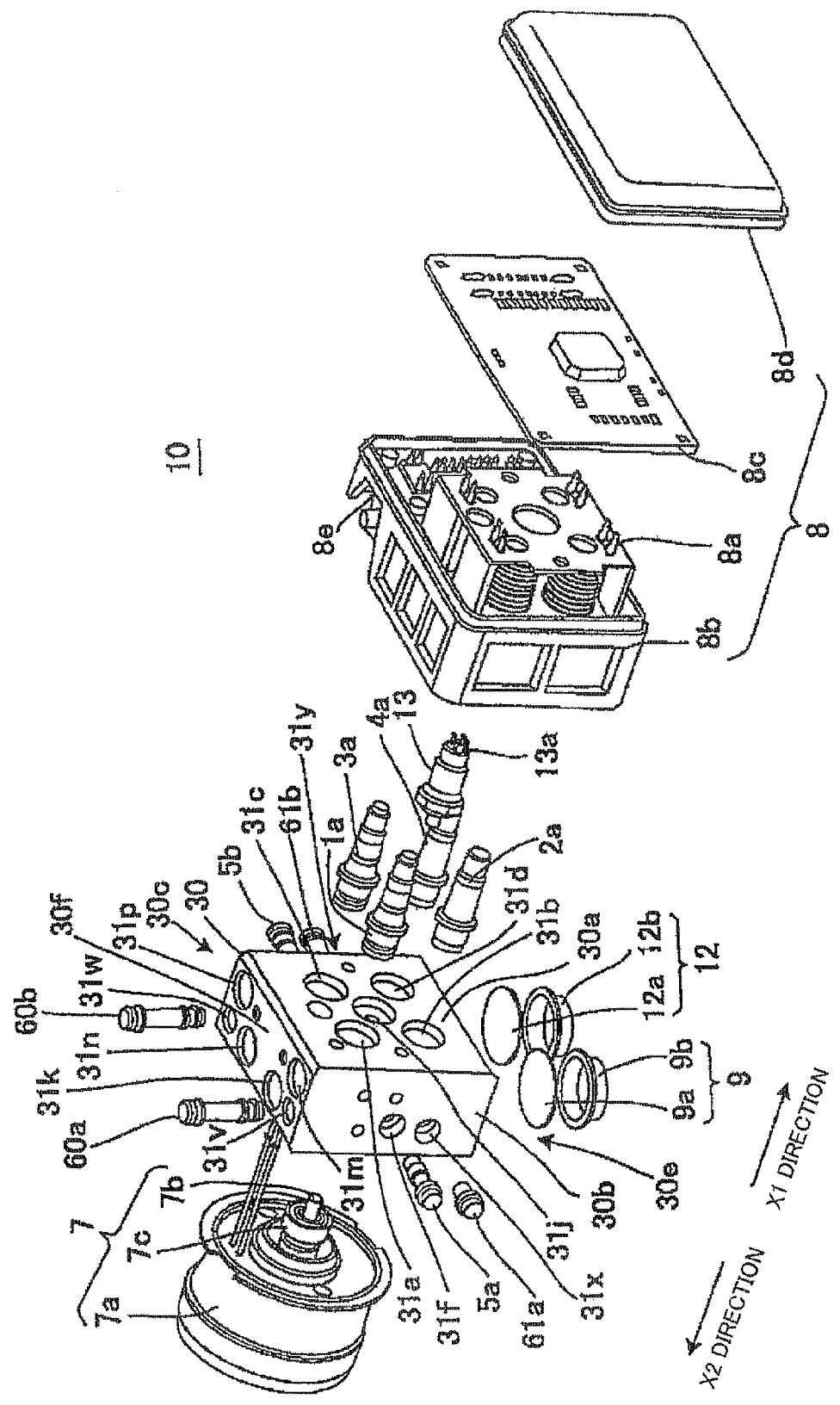
FIG. 2 An exploded perspective diagram showing the configuration of the brake fluid pressure control device pertaining to the embodiment of the present invention.

FIG. 2 is an exploded perspective diagram showing the configuration of the brake fluid pressure control device 10 pertaining to the present embodiment.

The brake fluid pressure control device 10 pertaining to the present embodiment is equipped with: a housing 30; first to fourth switching valve bodies 1a, 2a, 3a and 4a; the pressure sensor 13 that detects the brake fluid pressure; a pair of pistons 5a and 5b that pressurize the brake fluid; the electronic control unit (ECU) 8 that drives and controls the first to fourth switching valve bodies 1a, 2a, 3a and 4a; the motor 7 drives the pistons 5a and 5b; and the pair of accumulators 9 and 12 that reduce the brake fluid pressure.

Figure 3:
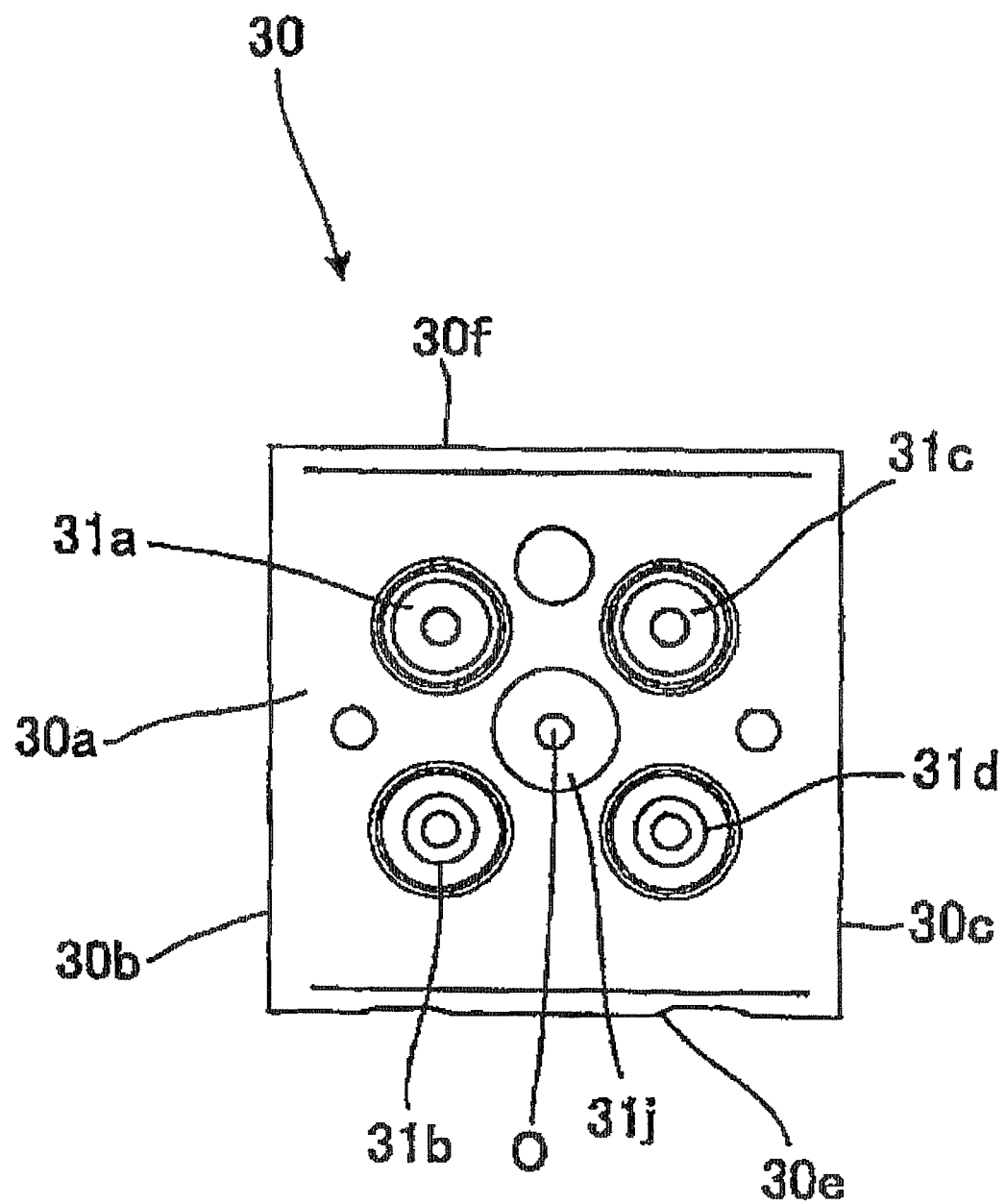
FIG. 3 A front diagram showing a housing of the brake fluid pressure control device pertaining to the embodiment of the present invention, with the housing shown in FIG. 2 being seen from the direction of X1.

The housing 30 comprises a metal such as aluminium, for example, and is formed in a substantially cuboid-shaped block. Further, the housing 30 includes a first side surface (front surface) 30a, a second side surface (left side surface) 30b, a third side surface (right side surface) 30c, a fourth side surface (rear surface) 30d, a fifth side surface (bottom surface) 30e and a sixth side surface (top surface) 30f. The first side surface 30a and the fourth side surface 30d that opposes this first side surface 30a are formed in a substantially square shape (see FIG. 3). Here, "substantially square shape" means that the ratio between the length of the vertical sides and the length of the horizontal sides (vertical length÷horizontal length×100) is, for example, in the range of 94 to 106%.

It will be noted that an anodized coating treatment is administered to the outer peripheral surface of the housing 30 and that, because of this surface treatment, selective coloring of the housing 30 becomes possible while improving corrosion control and wear resistance, so the outer peripheral surface of the housing 30 also has an excellent aesthetic appearance in terms of its design. In particular, sometimes this brake fluid pressure control device 10 is disposed in a position where it can be seen by a user in a two-wheeled motor vehicle, and the effect resulting from this improvement in its aesthetic appearance is large.

Further, a flow path comprising the aforementioned front wheel-use flow path 11 and rear wheel-use flow path 21 is formed inside the housing 30. Further, plural mounting holes 31a to 31p that are communicated with the front wheel-use and rear wheel-use flow paths 11 and 21 are respectively formed in the first to sixth side surfaces 30a to 30f.

Figure 5:
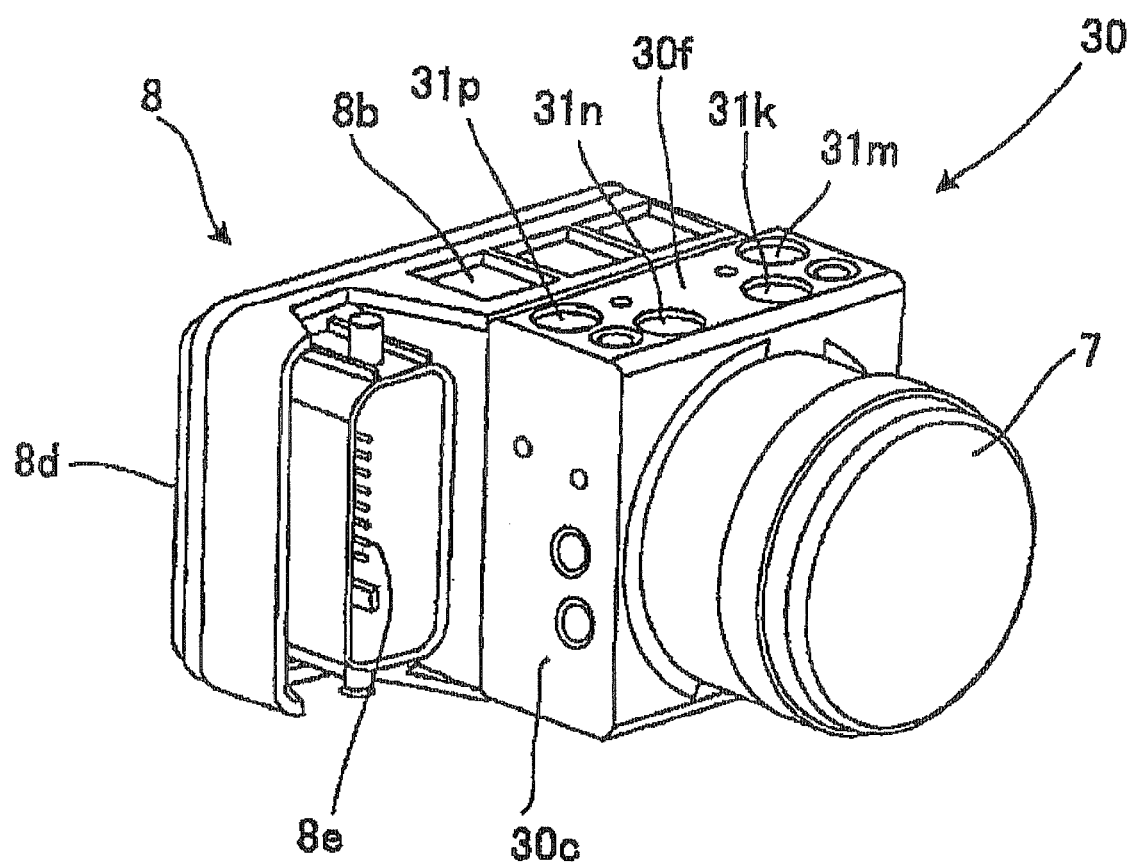
FIG. 5 A perspective diagram showing the brake fluid pressure control device pertaining to the embodiment of the present invention.

The electronic control unit (ECU) 8 includes a coil unit 8a, an ECU housing 8b, an electronic board (PCB) 8c for driving and controlling the coil unit 8a, and an ECU cover 8d that covers this electronic board 8c. The electronic control unit 8 is mounted on, so as to cover, the first side surface 30a. It will be noted that a connector 8e for connecting to the electronic board 8c is disposed on one side of the ECU housing 8b (e.g., the third side surface 30c side of the housing 30) (see FIG. 5). Further, a microcomputer is mainly configured on the electronic board 8c.

The coil unit 8a houses four coils for driving the first to fourth switching valve bodies 1a, 2a, 3a and 4a. The coils are disposed in positions corresponding to the first to fourth switching valve bodies 1a, 2a, 3a and 4a. Further, one side of each of the first to fourth switching valve bodies 1a, 2a, 3a and 4a is inserted into the inside of the corresponding coil and is driven and controlled by that coil. For example, the electronic control unit 8 can drive and control the first to fourth switching valve bodies 1a, 2a, 3a and 4a in the direction of X1 or the direction of X2 by exciting the corresponding coils. Thus, the front wheel-use flow path 11 and the rear wheel-use flow path 21 are switched between a communicated state and a blocked state.

The electronic control unit 8 can sophisticatedly perform antilock brake control by sophisticatedly driving and controlling the first to fourth switching valve bodies 1a, 2a, 3a and 4a on the basis, for example, of the rotational velocities of the front wheel and the rear wheel that have been detected by vehicle wheel velocity sensors (not shown) and the pressure of the brake fluid that has been detected by the pressure sensor 13.

The first to fourth switching valve bodies 1a, 2a, 3a and 4a are inserted and mounted inside mounting holes 31a to 31d formed in the first side surface 30a of the housing 30. Further, the first to fourth switching valve bodies 1a, 2a, 3a and 4a are driven and controlled by the coil unit 8a and respectively switch the front wheel-use flow path 11 and the rear wheel-use flow path 21 of the housing 30 between a communicated state and a blocked state.

It will be noted that the front wheel-use EV electromagnetic valve 1 is configured by the first switching valve body 1a and the coil unit 8a and that the front wheel-use AV electromagnetic valve 2 is configured by the second switching valve body 2a and the coil unit 8a. Further, the rear wheel-use EV electromagnetic valve 3 is configured by the third switching valve body 3a and the coil unit 8a, and the rear wheel-use AV electromagnetic valve 4 is configured by the fourth switching valve body 4a and the coil unit 8a.

The pressure sensor 13 detects the pressure of the brake fluid supplied to the front wheel-use master cylinder 103, for example. One end side of the pressure sensor 13 is inserted into a mounting hole 31j that is formed in a substantial center O of the mounting holes 31a to 31d for the first to fourth switching valve bodies 1a, 2a, 3a and 4a. Further, a connecting portion 13a on the other end side of the pressure sensor 13 is connected to the electronic board 8c of the electronic control unit 8. It will be noted that the center O of the mounting holes 31a to 31d substantially coincides with the center of the first side surface 30a. In other words, the mounting holes 31a to 31d for the first to fourth switching valve bodies 1a, 2a, 3a and 4a form a substantially square shape, for example, on the first side surface 30a, and a point of intersection of diagonal lines of the substantially square shape coincides with the center O (see FIG. 3).

As mentioned above, the pressure sensor 13 is disposed in the substantial center O of the first side surface 30a of the housing 30, the electronic control unit 8 is mounted with respect to this first side surface 30a, and the connecting portion 13a of the pressure sensor 13 and the electronic control unit 8 are interconnected. Thus, the interface between the pressure sensor 13 and the electronic control unit 8 becomes good.

The pair of pistons 5a and 5b are respectively inserted inside mounting holes 31e and 31f formed in the second and third side surfaces 30b and 30c and are capable of moving in the direction of the center O of the housing 30. Further, the pistons 5a and 5b can pressurize the brake fluid by reciprocally moving in the direction of the center O.

The motor 7 includes a motor body 7a, a drive shaft 7b that is coupled to the motor body 7a and is driven to rotate, and an eccentric cam 7c that is coupled to the drive shaft 7b. The motor body 7a is mounted on the fourth side surface 30d of the housing 30 (see FIG. 4(b)). Further, the drive shaft 7b and the eccentric cam 7c are rotatably inserted inside a mounting hole 31g formed in the fourth side surface 30d of the housing 30.

The pair of pistons 5a and 5b are energized by spring members or the like in the direction of the center O of the housing 30, and the distal end portions of the pistons 5a and 5b abut against the outer peripheral surface of the eccentric cam 7c of the motor 7. Consequently, there is configured a so-called plunger type pump where the pair of pistons 5a and 5b perform reciprocal motion when the eccentric cam 7c of the motor 7 is driven to rotate. It will be noted that the front wheel-use pump 5 and the rear wheel-use pump 6 are configured by the pair of pistons 5a and 5b and the motor 7.

The pair of accumulators 9 and 12 include elastic portions 9a and 12a, which comprise elastic members made of rubber, for example, and reduce the fluid pressure, and cover portions 9a and 12b, which cover these elastic portions 9a and 12a. The accumulators 9 and 12 are respectively mounted in mounting holes 31h and 31i formed in the fifth side surface 30e of the housing 30.

Further, a pair of pump outlet valves 60a and 60b are respectively disposed in a pair of mounting holes 31v and 31w formed in the sixth side surface 30f of the housing 30. Moreover, a pump inlet valve 61a is disposed in a mounting hole 31x formed in the second side surface 30b of the housing 30, and a pump inlet valve 61b is disposed in a mounting hole 31y formed in the third side surface 30c.

As mentioned above, in the housing 30, the pump outlet valve 60a and the pump inlet valve 61a are disposed as respectively separate bodies, and the pump outlet valve 60b and the pump inlet valve 61b are disposed as respectively separate bodies. Thus, the degree of freedom with which the valves 60a, 60b, 61a and 61b may be disposed improves, so the valves 60a, 60b, 61a and 61b can be compactly housed inside the housing 30.

Figure 4:
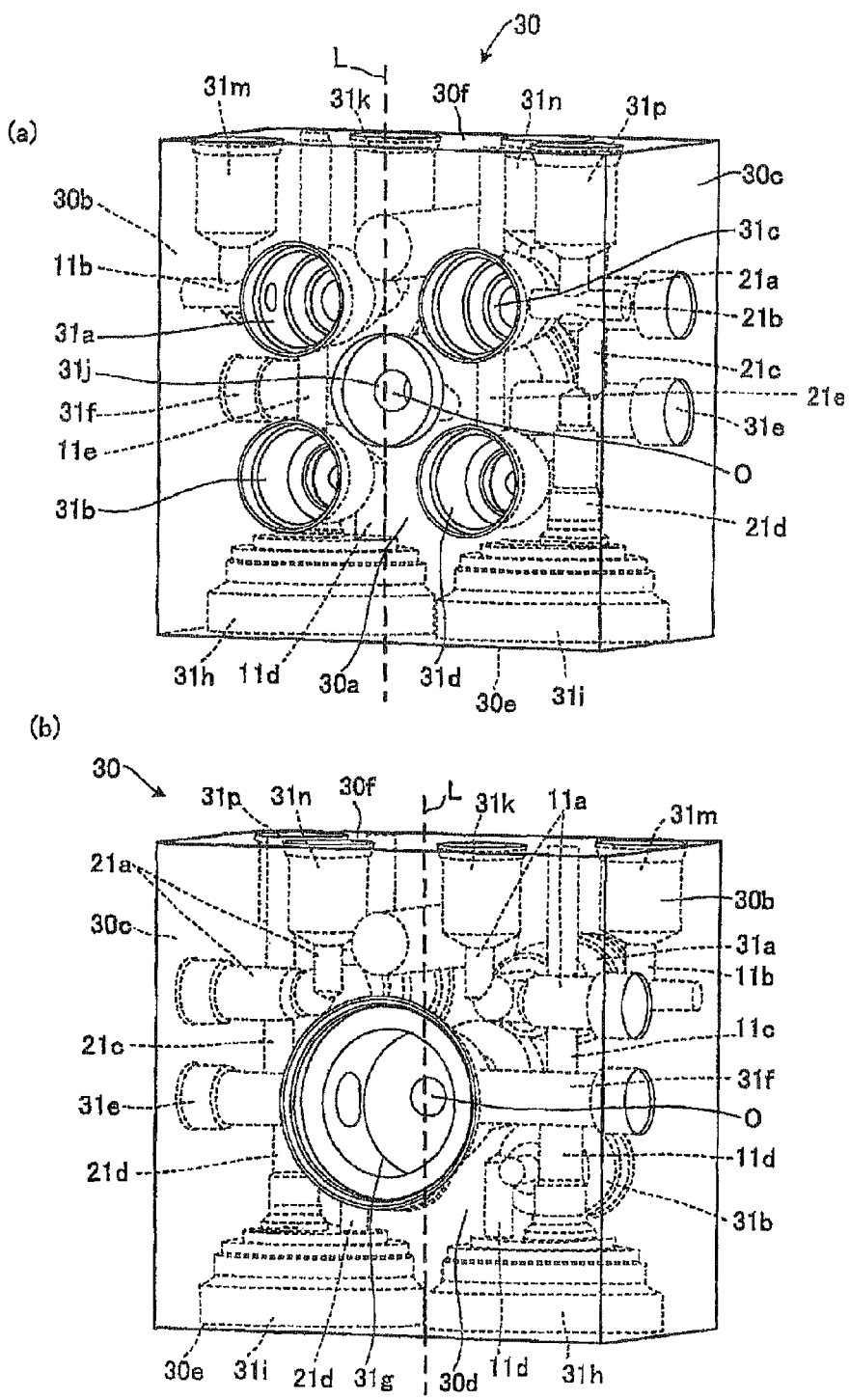
FIG. 4(a) A transparent diagram showing an overview of flow paths formed inside the housing of the brake fluid pressure control device pertaining to the embodiment of the present invention, with the housing shown in FIG. 2 being seen from an electronic control unit side. (b) A transparent diagram showing an overview of the flow paths formed inside the housing of the brake fluid pressure control device pertaining to the embodiment of the present invention, with the housing shown in FIG. 2 being seen from a motor side.

Next, the flow paths 11 and 21 formed inside the housing 30 of the brake fluid pressure control device 10 pertaining to the present embodiment will be described in detail. It will be noted that FIG. 4(a) is a transparent diagram showing an overview of the front wheel-use flow path 11 and the rear wheel-use flow path 21 formed inside the housing 30 of the brake fluid pressure control device 10, with the housing 30 shown in FIG. 2 being seen from the electronic control unit 8 side. Similarly, FIG. 4(b) is a transparent diagram showing an overview of the front wheel-use flow path 11 and the rear wheel-use flow path 21 formed inside the housing 30 of the brake fluid pressure control device 10, with the housing 30 shown in FIG. 2 being seen from the motor 7.

As shown in FIGS. 4(a) and (b), the mounting hole 31j into which the pressure sensor 13 is fitted is formed in the substantial center O of the first side surface 30a of the housing 30. The mounting hole 31a into which the first switching valve body 1a is inserted and the mounting hole 31b into which the second switching valve body 2a is inserted are formed side-by-side in the first side surface 30a along a first end edge (left end edge) of the first side surface 30a. Further, the mounting hole 31c into which the third switching valve body 3a and the mounting hole 31d into which the fourth switching valve body 4a is inserted are formed side-by-side in the first side surface 30a along a second end edge (right end edge) that opposes the first end edge.

The front wheel-use flow path 11 and the rear wheel-use flow path 21 are formed so as to become substantially symmetrical about a vertical direction centerline (vertical direction centerline of the first side surface 30a) L that crosses through the mounting hole 31j for this pressure sensor 13 or the motor 7. Thus, the pressure sensor 31 can access both the front wheel-use flow path 11 and the rear wheel-use flow path 21 without having to form a wasted flow path and easily detect the pressure of the brake fluid. Consequently, the housing 30 can be made compact and lightweight.

Further, the mounting holes 31a and 31b for the first and second switching valve bodies 1a and 2a are respectively communicated with the front wheel-use flow path 11, and the mounting holes 31c and 31d for the third and fourth switching valve bodies 3a and 4a are respectively communicated with the rear wheel-use flow path 21.

In the front wheel-use flow path 11, a substantially columnar M/C mounting hole 31k, to which the second pipe 108 from the front wheel-use master cylinder 101 is connected, is formed in the sixth side surface 30f of the housing 30. The M/C mounting hole 31k is connected to the first flow path 11a that bends in a substantial L shape toward the second side surface 30b side.

The first flow path 11a is connected to the third flow path 11c that extends downward (from the sixth side surface 30f side toward the fifth side surface 30e side). The mounting hole 31f, which is formed so as to extend straightly toward the center O side of the housing 30 and inside of which the piston 5a reciprocally moves, is formed in the third side surface 30c.

The third flow path 11c is connected to and communicated with this mounting hole 31f. Further, this mounting hole 31f is connected to and communicated with the fourth flow path 11d. The fourth flow path 11d extends downward, is communicated with the mounting hole 31h for the accumulator 9, turns upward (from the fifth side surface 30e side toward the sixth side surface 30f side) at this mounting hole 31h, and connects to the mounting hole 31b for the second switching valve body 2a.

The mounting hole 31a for the first switching valve body 1a and the mounting hole 31b for the second switching valve body 2a are interconnected and communicated with each other by the fifth flow path 11e. The mounting hole 31j for the pressure sensor 13 is connected to and communicated with the fifth flow path 11e in its side, for example, via a detection-use flow path (not shown). Thus, the pressure sensor 13 can detect, via a detection passage, the pressure of the brake fluid inside the fifth flow path 11e, that is, the pressure of the brake fluid supplied to the front wheel-use wheel cylinder 103.

A substantially columnar W/C mounting hole 31m, to which the third pipe 109 from the front wheel-use wheel cylinder 103 is connected, is formed in the sixth side surface 30f. The W/C mounting hole 31m and the mounting hole 31a for the first switching valve body 1a are interconnected and communicated with each other by the second flow path 11b that bends in a substantial L shape toward the third side surface 30c side.

It will be noted that the first switching valve body 1a switches the first flow path 11a and the second flow path 11b between a communicated state and a blocked state and that the second switching valve body 2a switches the fourth flow path 11d and the fifth flow path 11e between a communicated state and a blocked state.

Further, similar to the front wheel-use flow path 11, in the rear wheel-use flow path 21, a substantially columnar M/C mounting hole 31n, to which the fifth pipe 113 from the rear wheel-use master cylinder 104 is connected, is formed in the sixth side surface 30f of the housing 30. The M/C mounting hole 31n is connected to the first flow path 21a that bends in a substantial L shape toward the third side surface 30c side.

The first flow path 21a is connected to and communicated with the third flow path 21c that extends downward. The mounting hole 31e, which is formed so as to extend straightly toward the center O side of the housing 30 and inside of which the piston 5b reciprocally moves, is formed in the third side surface 30c. It will be noted that the mounting holes 31e and 31f for the pistons 5a and 5b are connected to and communicated with the mounting hole 31g for the motor 7.

The third flow path 21c is connected to and communicated with this mounting hole 31e. Further, the fourth flow path 21d is connected to and communicated with this mounting hole 31e. The fourth flow path 21d extends downward, is communicated with the mounting hole 31i of the accumulator 12, turns upward at this mounting hole 31i, and connects to the mounting hole 31d for the fourth switching valve body 4a.

The mounting hole 31c for the third switching valve body 3a and the mounting hole 31d for the fourth switching valve body 4a are interconnected and communicated with each other by the fifth flow path 21e. Further, a substantially columnar W/C mounting hole 31p, to which the fourth pipe 114 from the rear wheel-use wheel cylinder 106 is connected, is formed in the sixth side surface 30f. The W/C mounting hole 31p and the mounting hole 31c of the third switching valve body 3a are connected to and communicated with the second flow path 21b that bends in a substantial L shape.

It will be noted that the third switching valve body 3a switches the first flow path 21a and the second flow path 21b between a communicated state and a blocked state and that the fourth switching valve body 4a switches the fourth flow path 21d and the fifth flow path 21e between a communicated state and a blocked state.

As described above, in the brake fluid pressure control device 10 pertaining to the present embodiment, all of the configural members that become necessary for brake fluid pressure control (particularly, antilock brake control) of the two-wheeled motor vehicle—that is, the first to fourth switching valve bodies 1a, 2a, 3a and 4a, the pressure sensor 13, the pistons 5a and 5b, the electronic control unit 8, the motor 7 and the pair of accumulators 9 and 12—are efficiently disposed in the housing 30 without creating wasted space, and the front wheel-use flow path 11 and the rear wheel-use flow path 21 are formed inside the housing 30. Thus, the brake fluid pressure control device 10 can efficiently be made compact and lightweight even while sophisticated brake fluid pressure control using the pressure sensor 13 becomes possible.

It will be noted that, by making the brake fluid pressure control device 10 compact and lightweight as mentioned above, it becomes possible to mount the device 10 on the two-wheeled motor vehicle by one-point support. For example, the housing 30 of the brake fluid pressure control device 10 is mounted on the two-wheeled motor vehicle by one-point support via a bracket 40.

Figure 6:
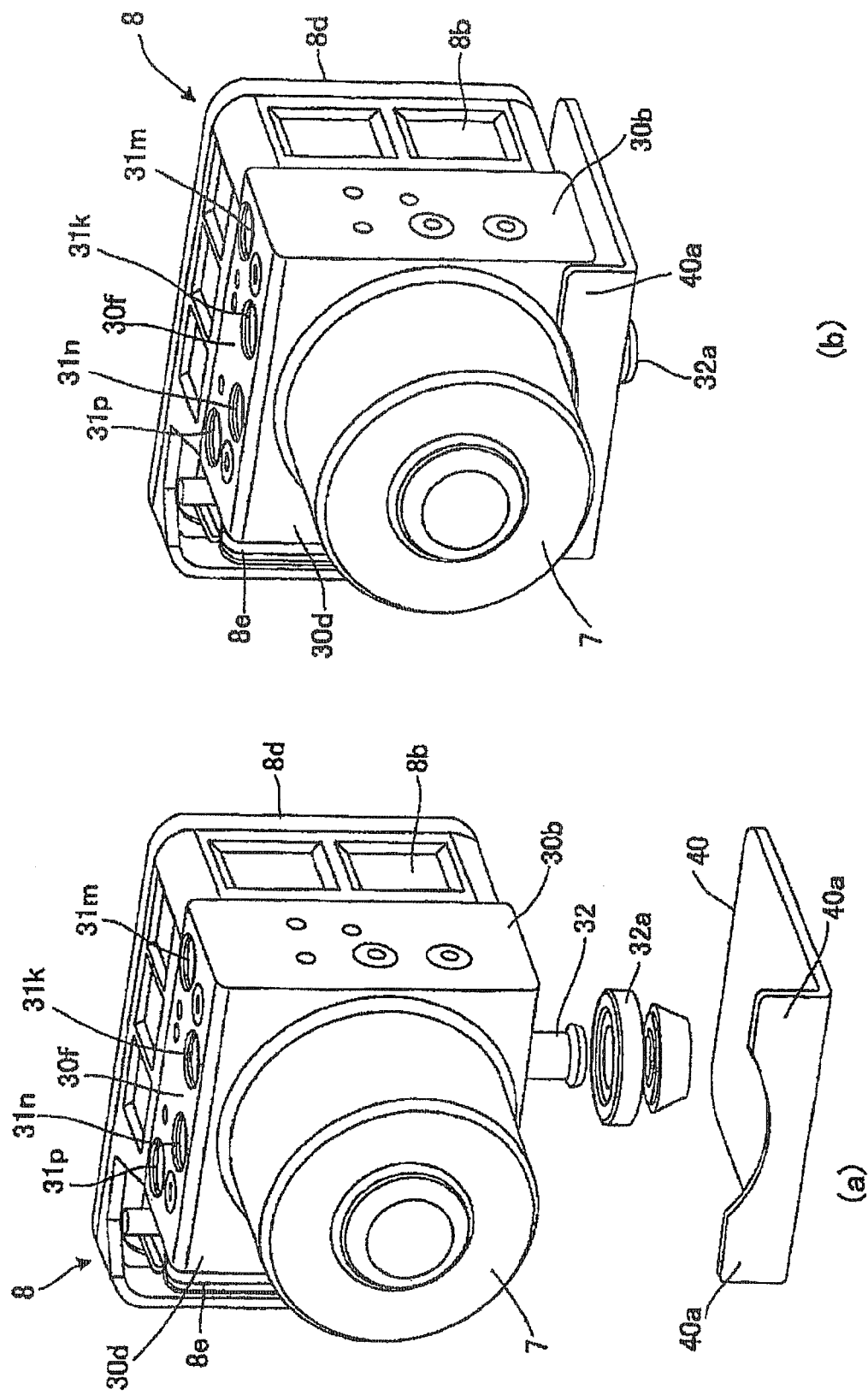
FIG. 6(a) A diagram showing a state before the brake fluid pressure control device pertaining to the embodiment of the present invention is mounted via a bracket by one-point support. (b) A diagram showing a state after the brake fluid pressure control device pertaining to the embodiment of the present invention has been mounted via the bracket by one-point support.

FIG. 6(a) is a diagram showing a state before the brake fluid pressure control device 10 is mounted by one-point support via the bracket 40. Further, FIG. 6(b) is a diagram showing a state after the brake fluid pressure control device 10 has been mounted by one-point support via the bracket 40.

A center pin 32 that extends downward is disposed in the substantial center of the fifth side surface 30e of the housing 30. Further, the bracket 40, whose cross section bends in an L shape, is mounted on the body of the two-wheeled motor vehicle.

An open portion (not shown) is formed in the bracket 40. The center pin 32 of the housing 30 is fitted together with this open portion, for example, via an adaptor 32a made of rubber. A pair of rotation stoppers 40a are formed on the bent end portion of the bracket 40. These rotation stoppers 40a prevent the housing 30 from relatively rotating with respect to the bracket 40 in a state where the housing 30 has been mounted on the bracket 40. Thus, the brake fluid pressure control device 10 can be more reliably locked and fixed with respect to the bracket 40.

In this manner, the brake fluid pressure control device 10 is made compact and lightweight, and it becomes possible to mount the device 10 on the two-wheeled motor vehicle by one-point support, so easy and reliable mounting of the control device 10 becomes possible. Consequently, the degree of freedom of the position where the device 10 is mounted on the two-wheeled motor vehicle improves.

That is, the brake fluid pressure control device 10 can efficiently be made compact and lightweight even while sophisticated brake fluid pressure control becomes possible, and there is achieved the effect of improving the degree of freedom of the position where the brake fluid pressure control device 10 is mounted on the two-wheeled motor vehicle.

It will be noted that the front wheel-use flow path 11 and the rear wheel-use flow path 21 inside the housing 30 are configured substantially symmetrically about the centerline L. Further, the mounting hole 31j for the pressure sensor 13 is formed in the substantial center O of the first to fourth switching valve bodies 1a, 2a, 3a and 4a, and the pressure sensor 13 is inserted into this mounting hole 31j.

By using this pressure sensor 13, pressure control can be performed sophisticatedly as mentioned above, and, moreover, the mounting hole 31j for the pressure sensor 13 can be easily connected via the detection-use flow path with respect to the nearest fifth flow path 11e. Further, the mounting hole 31j can also be easily connected via the detection-use flow path with respect to the mounting holes 31a and 31b where the same pressure of the brake fluid to the front wheel-use wheel cylinder 103 is detectable. In this manner, the number of options for connection destinations with respect to the mounting hole 31j for the pressure sensor 13 expands, the degree of freedom of design rises, the mounting hole 31j can be easily connected and the hydraulic circuit can be simplified. That is, the hydraulic circuit can be simplified and the brake fluid pressure control device 10 can be made compact and lightweight while making pressure control sophisticated.

Moreover, similar to when detecting the pressure of the brake fluid to the front wheel-use wheel cylinder 103, even when detecting the pressure of the brake fluid to the rear wheel-use wheel cylinder 106, the mounting hole 31j of the pressure sensor 13 can be easily connected with respect to the fifth flow path 21e and the mounting hole 31c or 31d via the detection-use flow path. Consequently, the number of options of connection destinations with respect to the mounting hole 31j of the pressure sensor 13 can be expanded, the degree of freedom of design can be improved, the mounting hole 31j can be easily connected, and the hydraulic circuit can be simplified. That is, pressure control can be made sophisticated, the hydraulic circuit can be simplified, and the brake fluid pressure control device 10 can be made compact and lightweight. Further, by making the brake fluid pressure control device 10 compact and lightweight as mentioned above, the degree of freedom of the position where the device 10 is installed on the vehicle can be improved.

While the invention has been described above with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include any embodiments falling within the scope of the appended claims.

For example, in the preceding embodiment, the mounting hole 31j for the pressure sensor 13 in the first side surface 30a is formed in the substantial center of the first to fourth switching valve bodies 1a, 2a, 3a and 4a, but it may also be formed in an arbitrary position between the first to fourth switching valve bodies 1a, 2a, 3a and 4a or in an arbitrary position on the inner side of the first to fourth switching valve bodies 1a, 2a, 3a and 4a. Moreover, the mounting hole 31j for the pressure sensor 13 may also be formed on the centerline L of the first side surface 30a.

Figure 7:
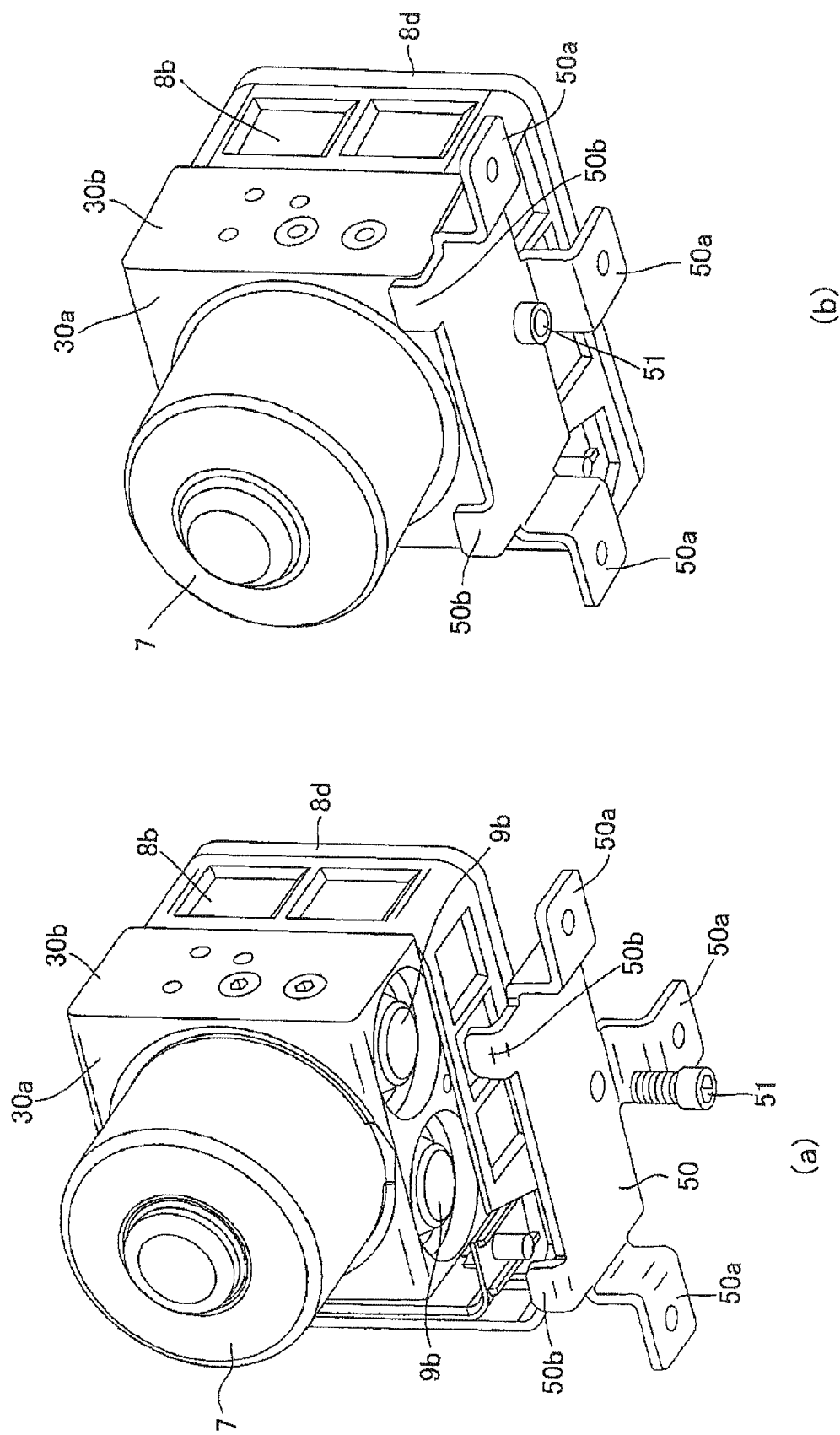
FIG. 7(a) A diagram showing a state before the brake fluid pressure control device pertaining to the embodiment of the present invention is mounted via a bracket by three-point support. (b) A diagram showing a state after the brake fluid pressure control device pertaining to the embodiment of the present invention has been mounted via the bracket by three-point support.

In the preceding embodiment, the housing 30 of the brake fluid pressure control device 10 is mounted on the two-wheeled motor vehicle by one-point support via the bracket 50, but the housing 30 is not limited to this and may also have a configuration where, for example, the housing 30 is mounted on the two-wheeled motor vehicle by three-point support via a bracket 50 that includes three support portions 50a (FIGS. 7(a) and (b)), and the support method may be arbitrary. The brake fluid pressure control device 10 may also have a configuration where it is supported and fixed by two-point support or fourth-point support, for example.

Specifically, the support portions 50a of the bracket 50 are coupled to the two-wheeled motor vehicle by bolts or the like. Further, a mounting surface of the bracket 50 is coupled to the fifth side surface 30e of the housing 30 via a bolt 51. Moreover, a pair of rotation stoppers 50b for preventing relative rotation of the housing 30 with respect to the bracket 50 are bent and formed on the bracket 50.

The invention claimed is:

1. A brake fluid pressure control device that is disposed between front wheel-use and rear wheel-use master cylinders and front wheel-use and rear wheel-use wheel cylinders and controls the pressure of a brake fluid supplied from the front wheel-use and rear wheel-use master cylinders to the front wheel-use and rear wheel-use wheel cylinders to thereby perform antilock brake control of a two-wheeled motor vehicle, the brake fluid pressure control device comprising:
 a block-shaped housing, inside of which are respectively formed a front wheel-use flow path for the brake fluid to flow from the front wheel-use master cylinder to the front wheel-use wheel cylinder and a rear wheel-use flow path for the brake fluid to flow from the rear wheel-use master cylinder to the rear wheel-use wheel cylinder;
 a pair of front wheel-use switching valve bodies that are mounted in a pair of mounting holes formed along one end edge of a first side surface that forms a substantially square shape of the housing, with the front wheel-use switching valve bodies switching the front wheel-use flow path between a communicated state and a blocked state to thereby control the pressure of the brake fluid supplied to the front wheel-use wheel cylinder;
 a pair of rear wheel-use switching valve bodies that are mounted in a pair of mounting holes formed along another end edge that opposes the one end edge of the first side surface of the housing, with the rear wheel-use switching valve bodies switching the rear wheel-use flow path between a communicated state and a blocked state to thereby control the pressure of the brake fluid supplied to the rear wheel-use wheel cylinder;
 a pressure sensor that is inserted inside a mounting hole in the first side surface of the housing and detects the pressure of the brake fluid supplied to the front wheel-use or rear wheel-use wheel cylinder; and
 an electronic control unit that is mounted on the first side surface, with the pressure sensor being connected to the electronic control unit, and drives and controls the front wheel-use and rear wheel-use switching valve bodies;
 wherein the pair of front wheel-use switching valve bodies comprise:
 a front wheel-use first electromagnetic valve, in a state where antilock brake control is not performed, are in an open state, and including an end side connected to a flow path which communicates with the front wheel-use master cylinder and an opposite end side connected to a flow path which communicates with the front wheel-use wheel cylinder; and
 a front wheel-use second electromagnetic valve, in a state where antilock brake control is not performed, are in a close state, and including an end side connected to a flow path which communicates with a suction side of a front wheel-use pump and an opposite end side connected to a flow path which communicates with the front wheel-use wheel cylinder,
 wherein the pair of rear wheel-use switching valve bodies comprise:
 a rear wheel-use first electromagnetic valve, in a state where antilock brake control is not performed, are in an open state, and including an end side connected to a flow path which communicates with the rear wheel-use master cylinder and an opposite end side connected to a flow path which communicates with the rear wheel-use wheel cylinder; and
 a rear wheel-use second electromagnetic valve, in a state where antilock brake control is not performed, are in a close state, and including an end side connected to a flow path which communicates with a suction side of a rear wheel-use pump and an opposite end side connected to a flow path which communicates with the rear wheel-use wheel cylinder,
 wherein the pressure sensor is configured to detect the pressure of the brake fluid between the front wheel-use first electromagnetic valve and the front wheel-use second electromagnetic valve, or the pressure of the brake fluid between the rear wheel-use first electromagnetic valve and the rear wheel-use second electromagnetic valve,
 wherein the pressure sensor is disposed in a substantial center of the front wheel-use first electromagnetic valve, the front wheel-use second electromagnetic valve, the rear wheel-use first electromagnetic valve, and the rear wheel-use second electromagnetic valve, and
 wherein the front wheel-use first electromagnetic valve, the front wheel-use second electromagnetic valve, the rear wheel-use first electromagnetic valve, and the rear wheel-use second electromagnetic valve are disposed in a substantially square shape, and the pressure sensor is disposed at a point of intersection of diagonal lines of the substantial square shape.

2. The brake fluid pressure control device according to claim 1, wherein the mounting holes for the pair of front wheel-use switching valve bodies are respectively formed so as to be parallel with respect to the one end edge of the first side surface, and wherein the mounting holes for the pair of rear wheel-use switching valve bodies are respectively formed so as to be parallel with respect to the other end edge of the first side surface.

3. The brake fluid pressure control device according to claim 2, wherein the pair of front wheel-use switching valve bodies and the pair of rear wheel-use switching valve bodies are disposed so as to become substantially symmetrical about a vertical direction centerline of the first side surface.

4. The brake fluid pressure control device according to claim 2, wherein the front wheel-use flow path and the rear wheel-use flow path are formed so as to become substantially symmetrical about the vertical direction centerline of the first side surface.

5. The brake fluid pressure control device according to claim 2, further comprising a bracket that is mounted on a side surface of the housing, wherein the brake fluid pressure control device is mounted on the two-wheeled motor vehicle via the bracket.

6. The brake fluid pressure control device according to claim 5, wherein a pin member that extends downward is formed on the fifth side surface of the housing, wherein an open portion into which the pin member is inserted is formed in the bracket, and wherein the pin member of the housing and the open portion of the bracket are coupled together, whereby the brake fluid pressure control device is supported at one point.

7. The brake fluid pressure control device according to claim 1, wherein the pair of front wheel-use switching valve bodies and the pair of rear wheel-use switching valve bodies are disposed so as to become substantially symmetrical about a vertical direction centerline of the first side surface.

8. The brake fluid pressure control device according to claim 7, wherein the front wheel-use flow path and the rear wheel-use flow path are formed so as to become substantially symmetrical about the vertical direction centerline of the first side surface.

9. The brake fluid pressure control device according to claim 7, further comprising a bracket that is mounted on a side surface of the housing, wherein the brake fluid pressure control device is mounted on the two-wheeled motor vehicle via the bracket.

10. The brake fluid pressure control device according to claim 9, wherein a pin member that extends downward is formed on the fifth side surface of the housing, wherein an open portion into which the pin member is inserted is formed in the bracket, and wherein the pin member of the housing and the open portion of the bracket are coupled together, whereby the brake fluid pressure control device is supported at one point.

11. The brake fluid pressure control device according to claim 1, wherein the front wheel-use flow path and the rear wheel-use flow path are formed so as to become substantially symmetrical about the vertical direction centerline of the first side surface.

12. The brake fluid pressure control device according to claim 11, further comprising a bracket that is mounted on a side surface of the housing, wherein the brake fluid pressure control device is mounted on the two-wheeled motor vehicle via the bracket.

13. The brake fluid pressure control device according to claim 1, further comprising a bracket that is mounted on a side surface of the housing, wherein the brake fluid pressure control device is mounted on the two-wheeled motor vehicle via the bracket.

14. The brake fluid pressure control device according to claim 13, wherein a pin member that extends downward is formed on the fifth side surface of the housing, wherein an open portion into which the pin member is inserted is formed in the bracket, and wherein the pin member of the housing and the open portion of the bracket are coupled together, whereby the brake fluid pressure control device is supported at one point.

15. The brake fluid pressure control device according to claim 1, wherein the pair of front wheel-use switching valve bodies and the pair of rear wheel-use switching valve bodies are disposed on the first side surface of the housing, and the size of each of the switching valve bodies as viewed from the first side surface of the housing is substantially equal to or larger than the size of the pressure sensor as viewed from the first side surface of the housing.

16. The brake fluid pressure control device according to claim 1, wherein a mounting hole that is communicated with the front wheel-use flow path is formed in a second side surface of the housing and a mounting hole that is communicated with the rear wheel-use flow path is formed in a third side surface of the housing, the second side surface and the third side surface being perpendicular to the first side surface of the housing and oppose each other, and wherein the brake fluid pressure control device further comprises:

a plunger type pump that includes a pair of pistons that are mounted inside the mounting holes in the second side surface and the third side surface and pressurize the brake fluid inside the front wheel-use and rear wheel-use flow paths and a motor that is disposed on a fourth side surface opposing the first side surface and causes the pair of pistons to reciprocally move; and a pair of accumulators that are disposed on a fifth side surface adjacent to the first side surface and decreases the pressure of the brake fluid.

\* \* \* \* \*